Figures 1, 2:
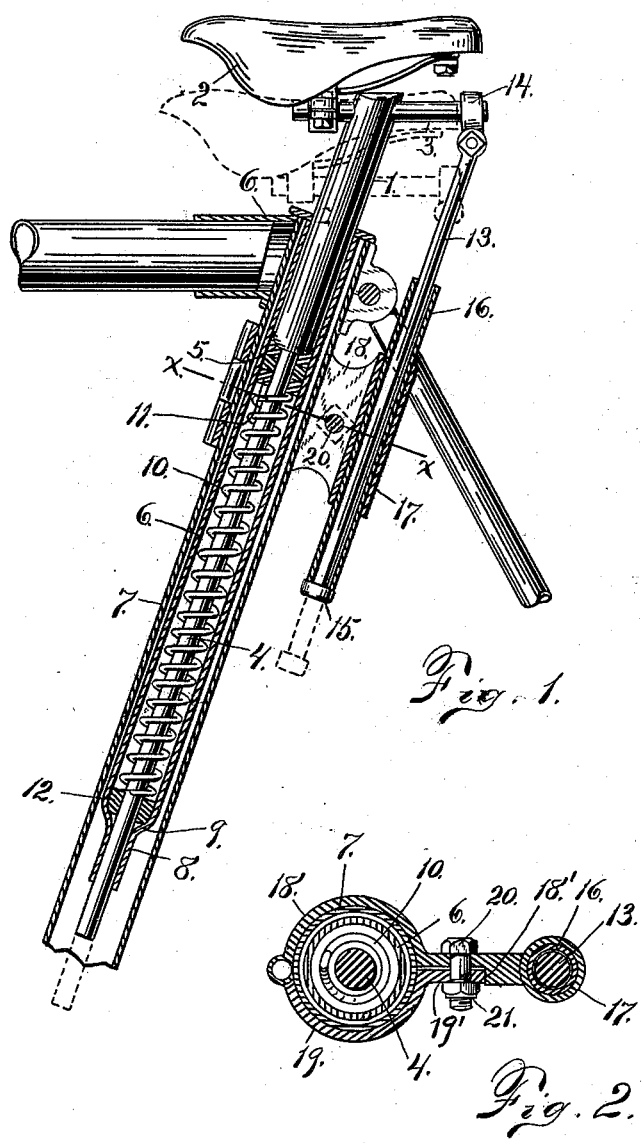

(No Model.)

A. H. HOLLAND.
SPRING SEAT FOR VEHICLES.

No. 606,413. Patented June 28, 1898.

Witnesses.

Inventor.
Albert H. Holland
by
W. T. Miller
Attorney.

UNITED STATES PATENT OFFICE.

ALBERT H. HOLLAND, OF BUFFALO, NEW YORK.

SPRING-SEAT FOR VEHICLES.

SPECIFICATION forming part of Letters Patent No. 606,413, dated June 28, 1898.

Application filed June 21, 1897. Serial No. 641,588. (No model.)

*To all whom it may concern:*

Be it known that I, ALBERT H. HOLLAND, a citizen of the United States, residing at Buffalo, in the county of Erie and State of New York, have invented certain new and useful Improvements in Spring-Seats for Vehicles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in spring-seats for vehicles, and more particularly to that class of seat for which Letters Patent No. 567,314 were granted to me on the 8th day of September, 1896.

The object of my present invention is to simplify the construction covered by my former patent.

To this end my invention consists in the construction and arrangement of the several parts, as hereinafter more fully described and claimed and as illustrated in the accompanying drawings, wherein—

Figure 1 is a side elevation, partly in section, of my improved spring-seat for vehicles; and Fig. 2 is an enlarged section taken in the line $x$ $x$ of Fig. 1.

Referring to the drawings, it will be seen that by way of illustration I have shown my invention as applied to a bicycle, although I intend it to be equally applicable to a single seat adapted for use not only upon a bicycle, but upon cultivators, harvesters, or other analogous vehicles or machines where it is desirable to break the jar produced by passing over rough and uneven surfaces.

1 is the seat-bar, carrying the bicycle seat or saddle 2 upon a horizontal rod 3, secured near its upper end. The seat-bar 1 is preferably cylindrical and has at its lower end a cylindrical extension 4 of smaller diameter, forming the annular shoulder 5. A tubular casing 6 is removably secured by swaging or otherwise in the tube 7, forming a part of the frame of the bicycle. This casing 6 has a contracted or reduced lower end 8, forming the interior annular shoulder 9. The seat-bar 1 fits loosely but snugly in the tubular casing 6, and its lower reduced extension passes through and extends somewhat beyond the contracted or reduced lower end 8 of the casing 6, in which it loosely but snugly fits.

10 is a spiral spring which surrounds the reduced portion 4 of the seat-bar 1 and within the casing 6. The upper end of the spring 10 has a bearing contact with the washers 11, placed just below and resting against the annular shoulder 5 on the seat-bar 1, and the lower end of the spring 10 has a bearing contact with the washer 12, which rests upon the annular shoulder 9, formed by the contracted lower end 8 of the casing 6.

13 is my improved keeper, which is in the form of a cylindrical bar, its upper end being tightly and removably secured to the rear end of the bar 3 by the clip 14. The lower end of the keeper is provided with the annular shoulder or flange 15.

16 is an elongated tubular socket adapted for the loose but snug reception of the keeper 13, which is parallel with the seat-bar 1 and partakes of its motion.

18 is a clip which is secured to the frame of the wheel. This clip extends to the rear and is provided at or near its extremity with a tubular opening 17, in which opening a tubular socket 16 is securely and adjustably held. The rod or keeper 13 passes through this socket, so that the flange or shoulder 15 rests against the lower end thereof. The socket can be adjusted to any desired height, and being held securely will admit of only a limited or prevent a too free expansion of the spring 4, which surrounds the seat-post 1. The front portion of the clip is somewhat larger than the rear portion and is composed of two circular members 18 and 19. The member 18 together with the rear socket are all integral, and said member is provided midway between the two sockets with a recess 18'. The other member 19 is hinged to the member 18 at its front end and has a flat extension 19' projecting from its rear end, so that when closed this extension will rest within the recess 18'. Both the members are provided with holes which will register when the whole is closed, so that a bolt 20 may pass therethrough and by means of a nut 21 hold the clip in position on the frame. This keeper 13 being adapted for free reciprocation in its elongated socket 16 permits of the vertical play of the seat-bar and prevents its turning in its socket. At the same time it does not allow of being forcibly expelled from the casing in which it plays by reason of the annular flange 15 at the lower end of the keeper.

In operation as the seat-bar and keeper are forced downwardly under the weight of the rider, as shown in dotted lines, and upwardly by the reflex action of the spring 10 they have an easy and steady action within the casing and socket.

The spiral spring 10 is to be made of lighter or heavier material, according to the weight of the rider, and its tension may be regulated, as desired, by increasing or decreasing the number of washers 11 and 12 at each end thereof.

My improved rigid keeper being parallel with the seat-bar is more compact than the flexible jointed keeper in my former patent, and the elimination of the joints makes it more durable and reliable in action, with the additional advantage of a material reduction in cost.

I claim—

1. A spring-seat post for vehicles consisting of a tubular casing removably secured within the frame-tubing of a bicycle, a seat-bar within the casing, and a spiral spring between the bar and casing; a clip removably secured to the frame-tubing of the bicycle and provided with a socket in its rear end, and a keeper secured to the rear end of the seat-bar and passing through the socket, substantially as described.

2. A spring-seat post for vehicles consisting of a tubular casing removably secured within the frame-tubing of a bicycle, a seat-bar within the casing, and a spring between the bar and casing; a removable clip adjustably secured to the frame-tubing and having an upright opening near its rear end, a tubular socket held within the opening, a keeper removably secured to rear end of the seat-bar and passing through the tubular socket, and a flange near the lower end of the keeper, substantially as and for the purpose set forth.

In testimony whereof I have signed my name to this specification in the presence of two subscribing witnesses.

ALBERT H. HOLLAND.

Witnesses:
F. V. SEARS,
W. T. MILLER.